United States Patent [19]

Kosaka et al.

[11] Patent Number: 4,713,768
[45] Date of Patent: Dec. 15, 1987

[54] METHOD OF LOCALIZING A MOVING BODY

[75] Inventors: Michitaka Kosaka, Sagamihara; Katsumi Kawano, Fuchu; Shoji Miyamoto, Kawasaki, all of Japan

[73] Assignee: Hitachi, Ltd., Tokyo, Japan

[21] Appl. No.: 696,077

[22] Filed: Jan. 29, 1985

[30] Foreign Application Priority Data

Feb. 20, 1984 [JP] Japan ............................ 59-28533
Jul. 11, 1984 [JP] Japan ........................... 59-142284

[51] Int. Cl.⁴ .................... G01C 15/20; G01S 3/02
[52] U.S. Cl. ............................. 364/460; 364/449; 342/451
[58] Field of Search ............ 356/1; 364/456, 460, 364/571, 516, 457; 250/203 R, 222.1; 342/389, 396, 451; 340/917, 988

[56] References Cited

U.S. PATENT DOCUMENTS

| | | | |
|---|---|---|---|
| 3,311,738 | 3/1967 | Makow | 342/451 X |
| 4,281,327 | 7/1981 | Frazier et al. | 342/451 X |
| 4,328,548 | 5/1982 | Crow et al. | 342/451 X |
| 4,398,198 | 8/1983 | Dano et al. | 342/451 X |
| 4,466,067 | 8/1984 | Fontana | 364/460 |
| 4,488,249 | 12/1984 | Baker | 364/571 |

Primary Examiner—Errol A. Krass
Assistant Examiner—Joseph L. Dixon
Attorney, Agent, or Firm—Antonelli, Terry & Wands

[57] ABSTRACT

A method of localizing a moving body, by which the magnitude of parameters, which can give rise to bias errors, is estimated inversely from the difference between two locations of the moving body estimated by two different localization methods. Various quantities (position of sensors, propagation velocity of radiation, etc.), on the basis of which localization operations are carried out, can be corrected by using the magnitude thus estimated. The emission time of the radiation from the moving body can be estimated by the hyperbolic surface localization method and the spherical surface localization method can utilize the emission time thus estimated to localize the moving body. Further, localization errors caused by both localization methods can be estimated, so that it is possible to determine which localization method should be used to localize the moving body.

14 Claims, 7 Drawing Figures

METHOD OF LOCALIZING A MOVING BODY

BACKGROUND OF THE INVENTION

This invention relates to a method of localizing precisely a moving body such as a ship, an automobile, an artificial satellite, etc., and more specifically to a method of localizing a moving body as mentioned above with high precision by receiving energy of radiations, such as acoustic waves, electromagnetic waves, etc., emitted the moving body by using a plurality of sensors disposed at different places and on the basis of reception times measured by the plurality of sensors; or, in the alternative, by receiving energy of radiations, such as acoustic wave, electromagnetic wave, etc. emitted at a plurality of different places using a sensor disposed on the moving body and on the basis of reception times measured by the sensor.

Heretofore, in order to estimate the location of a moving body, e.g. as indicated in FIG. 1, radiations, such as acoustic wave, electromagnetic wave, etc. emitted by a moving body 1 are received by a plurality of sensors $S_i$ (i=1, 2, ..., n) disposed at different places, which are respectively at a distance $d_i$ from the moving body, at a time $t_i$, respectively. A moving body localization calculation device 2, receives the radiations detected by the sensors, and calculates an estimated location of the moving body by the least-squares method. It is well known that the representative methods of realizing this estimation are the spherical surface localization method and the hyperbolic surface localization method. These localization methods are described in e.g. "Localization Method in Vehicle Automation" by Tsumura, System and Control, Vol. 25, No. 3 (1981).

In FIG. 1, the moving body localization calculation device 2 consists of a memory device 3, a processing device 4 and a display device 5. Radiation emitted by the moving body 1 is received by a sensor $S_i$, which is at a distance $d_i$ therefrom. The sensor $S_i$ transmits the time $t_i$, at which the radiation is received, to the moving body localization calculation device 2. The reception time $t_i$ satisfies the following equation (1).

$$t_i = d_i/Ve + T + n_i \quad (1)$$

where Ve designates the propagation velocity of the radiation, T represents the emission time of the radiation by the moving body 1, and $n_i$ denotes noises due to various factors, such as measurement errors, propagation delay of the wave, etc.

The signal emitted by the moving body 1 is a pulse signal as indicated in FIG. 2, where it is supposed that the time interval between two successive pulses $T_o$ is constant. It is also supposed that the time interval $T_o$ is sufficiently long with respect to the propagation time of the radiation.

In the moving body localization calculation device 2, input data are once stored in the memory device 3. Then the processing device 4 calculates the location of the moving body and outputs the obtained results to the display device 5. In the processing device the position $(\alpha_i, \beta_i, \gamma_i)$ of the sensor $S_i$, which was measured beforehand, is stored so that it is ready to be utilized.

The hyperbolic surface localization method is a method, by which an intersecting point of a plurality of hyperbolic surfaces in a space, where the difference between two reception times in constant, is assumed to be the position of the moving body and is determined using time differences between two receptions of the radiation by the plurality of sensors. That is, representing the position of the moving body by (x, y, z), for sensors $S_i$ and $S_j$, the following non-linear equation is valid.

$$t_i - t_j = \sqrt{(x - \alpha_i)^2 + (y - \beta_i)^2 + (z - \gamma_i)^2} / Ve - \sqrt{(x - \alpha_j)^2 + (y - \beta_j)^2 + (z - \gamma_j)^2} / Ve + n_i - n_j \quad (2)$$

where i, j = 1, 2, ..., n (i≠j). Then, (x, y, z) are determined by the non-linear least-squares method so that the following value (equation (3)) is minimum.

$$\sum_{i,j} \{t_i - t_j - \sqrt{(x - \alpha_i)^2 + (y - \beta_i)^2 + (z - \gamma_i)^2} / Ve + \sqrt{(x - \alpha_j)^2 + (y - \beta_j)^2 + (z - \gamma_j)^2} / Ve\}^2 \quad (3)$$

On the other hand, the spherical surface localization method is a method, by which assuming that the emission time of the radiation from the moving body is known, an intercepting point of a plurality of spherical surfaces is assumed to be the position of the moving body, where the propagation time of the radiation from each of the sensors is constant. That is, assuming that the emission time T of the radiation from the moving body is known, the following non-linear equation is valid.

$$t_i - T = \sqrt{(x - \alpha_i)^2 + (y - \beta_i)^2 + (z - \gamma_i)^2} / Ve + n_i \quad (4)$$

where i=1, 2, ..., n. Then, (x, y, z) are determined by the non-linear least-squares method so that the value $$\sum_i \{t_i - T - \sqrt{(x - \alpha_i)^2 + (y - \beta_i)^2 + (z - \gamma_i)^2} / Ve\}^2 \quad (5)$$

is minimum.

Since both the methods described above are based on the method of least squares, they can remove random errors $n_i$, $n_j$ such as measurement errors, however, they cannot remove bias errors, i.e. systematic errors due to erroneous quantities, such as measurement errors on the position of the sensors $(\alpha_i, \beta_i, \gamma_i)$, deviations from the expected value of the propagation velocity Ve of the radiation, etc. These bias errors cause different error for the 2 localization methods using the least-squares method, e.g. for the hyperbolic surface localization method and the spherical surface localization method and as indicated in FIG. 3, even if identical measured data are used, the estimated location of the moving body differs depending on what localization method is used and, according to circumstances, this difference can be considerably great.

Furthermore, by the hyperbolic surface localization method, it is difficult to determine the time for the calculated position of the moving body. Another problem is that a localization calculation of the hyperbolic surface localization method requires a long processing time. To the contrary, by the spherical surface localization method, although a processing time for a localization calculation is shorter, it cannot be used, unless the emission time of the radiation is known. Thus, either one of the localization methods described above gives a high precision in the localization of a moving body, depending on the geometrical relation between the moving body and the group of sensors. However, since both the localization methods have various restrictive conditions, in practice, these restrictive conditions must be taken into account. The choice of either one of the localization methods is not an important problem for a system in which error factors concerning the propagation of the radiation, such as an acoustic wave, an electromagnetic wave, etc. are small, but it is an important problem for a system requiring high precision, for which error factors concerning the propagation of the radiation are great.

SUMMARY OF THE INVENTION

An object of this invention is to provide a method which removes the bias errors described above for the localization methods utilizing the least-squares method such as the hyperbolic surface localization method and the spherical surface localization method, to ameliorate measurement precision, and thus to estimate the position of a moving body with a high precision.

Another object of this invention is to provide a method for choosing a more suitable localization method depending on the position of the moving body and thus to estimate the position of the moving body with a high precision.

The features of this invention include the magnitude of parameters, which can give rise to bias errors, being estimated inversely from the difference between two locations of the moving body estimated by the two localization methods stated above and various quantities (position of the sensors, propagation velocity of the radiation, etc.). On the basis of this, localization operations can be corrected by using the magnitude thus estimated. The emission time of the radiation from the moving body is estimated by the hyperbolic surface localization method and the spherical surface localization method, can use the emission time thus estimated so that utilization of both the localization methods is possible, and further that localization errors by both the localization methods are estimated so that it is possible to determine which localization method should be used.

DESCRIPTION OF THE PREFERRED EMBODIMENTS

Figure 1:
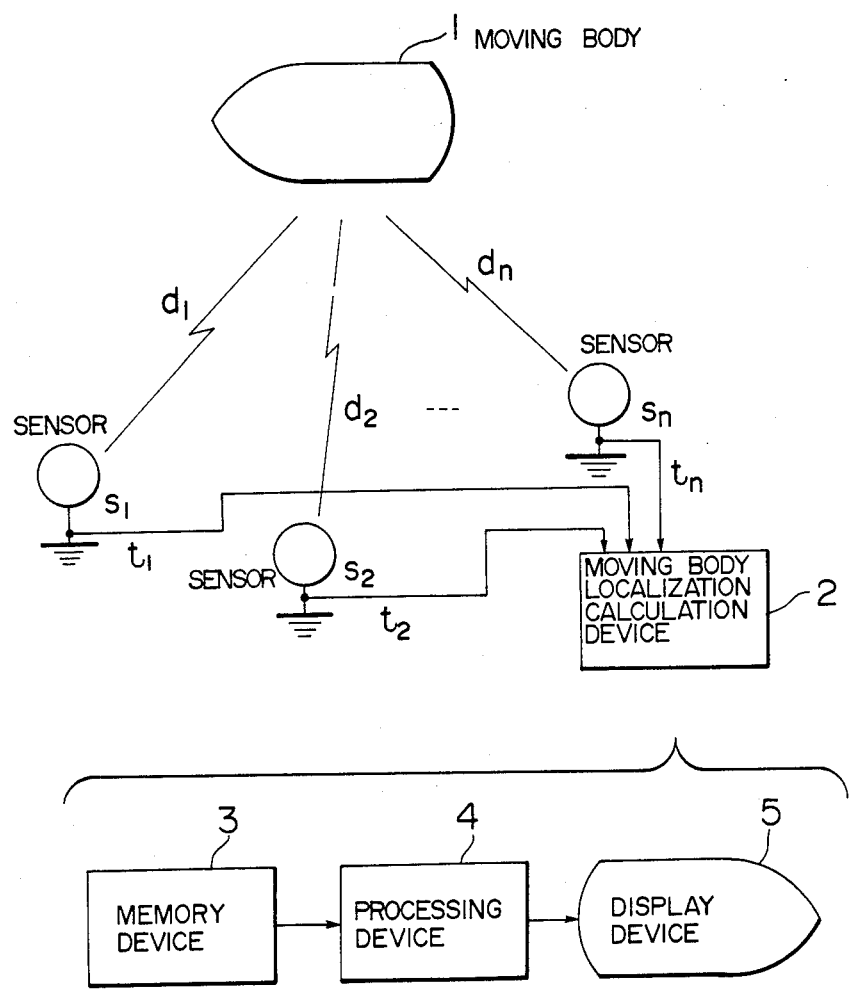
FIG. 1 is a schematic showing an example of a conventional localization system, to which this invention is applied.
Figure 2:
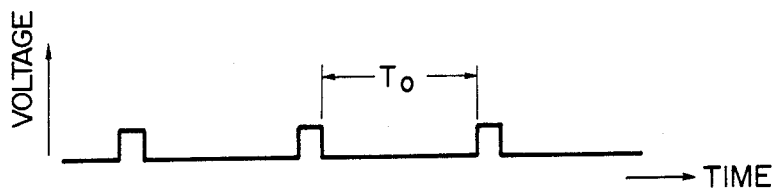
FIG. 2 is a schematic showing an example of signals emitted by the moving body.
Figure 3:
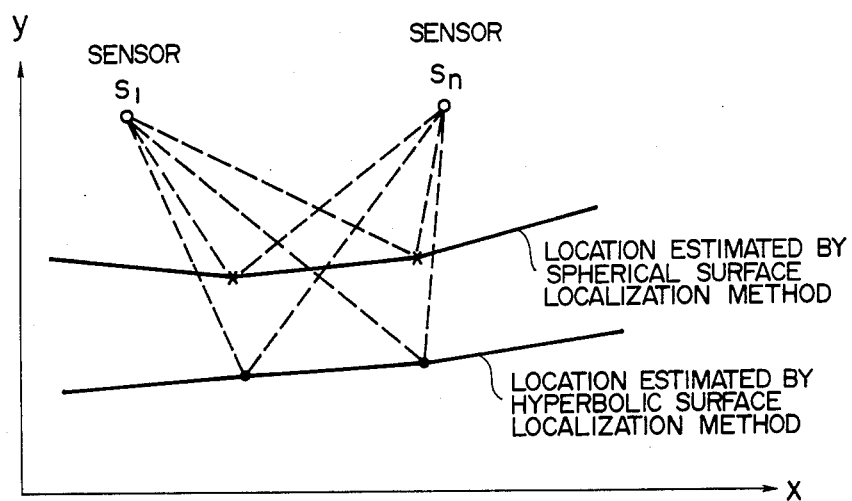
FIG. 3 is a diagram showing differences between results obtained by the spherical surface localization method and those obtained by the hyperbolic surface localization method.

Consider at first the case where the localization method according to this invention is applied to the localization system indicated in FIG. 1, i.e. the case where radiation, such as an acoustic wave, an electromagnetic wave, etc., emitted by a moving body is received by a plurality of sensors disposed at different places, and on the basis of reception times of the radiation by the plurality of sensors, the location of the moving body at the time when the radiation is emitted is detected.

The principle of the operation by the spherical surface localization method and that by the hyperbolic surface localization method have been already stated. However, since linear operation is preferable in the processing device 4, hereinbelow operation is effected in a linear approximation.

At first, for the spherical surface localization method, the non-linear equation (4) can be expressed in linear approximation as follows;

$$\tau_i V_e^i = d_i + P_i \Delta X + \epsilon_i \qquad (6),$$

where $\tau_i = t_i - T$: propagation time of the signal to the sensor $S_i$, $V_e^i$: propagation velocity of the signal to the sensor $S_i$, $d_i$: distance between the sensor $S_i$ and the moving body 1, $P_i$: unit direction vector from the sensor $S_i$ to the moving body, $\Delta X$: first order increment in linear approximation, and $\epsilon_i$: random errors due to various factors.

If $\Delta X$ is sufficiently small, the linear approximation model represented by Eq. (6) can be used. The equations (6) for $i = 1 \ldots n$ can be expressed collectively by the following matrix equation; therefore, $$Y_S = Y = H\Delta X + \epsilon \qquad (7')$$

$$Y = H\Delta X + \epsilon \qquad (7)$$

where $$Y = \begin{bmatrix} \tau_1 V_e^1 - d_1 \\ \tau_2 V_e^2 - d_2 \\ \vdots \\ \tau_n V_e^n - d_n \end{bmatrix}, H = \begin{bmatrix} P_1 \\ P_2 \\ \vdots \\ P_n \end{bmatrix}, \epsilon = \begin{bmatrix} \epsilon_1 \\ \epsilon_2 \\ \vdots \\ \epsilon_n \end{bmatrix}$$

and by the least-squares method $\Delta X$ can be represented by $$\text{ti } \Delta \hat{X}^S = (H^T H)^{-1}(H^T Y) \qquad (8)$$

where $\Delta \hat{X}^S$ is the value of $\Delta X$ estimated by the spherical surface localization method. In Eq. (8) the superscripts "T" and "−1" signify the transposition and the inversion of the matrix, respectively.

In the same way, for the hyperbolic surface localization method, the non-linear equation (2) can be expressed in linear approximation as follows;

$$V_e^{ij}(t_i-t_j)=d_i+P_i\Delta X-(d_j+P_j\Delta X)+\epsilon_1-\epsilon_j \quad (9)$$

where $V_e^{ij}$ denotes the propagation velocity of the signal to the sensors $S_i$ and $S_j$. Since $t_i-t_j=\tau_i-\tau_j$, using a (n) line by (n+1) row matrix $$J = \begin{pmatrix} 1 & -1 & 0 & \cdots & 0 \\ 0 & 1 & -1 & & 0 \\ \vdots & & \ddots & \ddots & \vdots \\ 0 & \cdots & & 1 & -1 \end{pmatrix}$$

as the matrix for the sensor selection of i and j for hyperbolic surface localization method, the following equation can be obtained.

Hence, from equations (7') and (10), the following equations are true:

$$\Delta Y^H = J\Delta Y$$

$$\Delta Y_S = \Delta Y,$$

where $\Delta Y$ is assumed to be a linear conversion of the bias error factor $\alpha$ as shown by equation (14).

$$Y_H = JY = JH\Delta X + J\epsilon \quad (10)$$

Further, by the least-squares method the following equation is obtained.

$$\Delta X^H = \{(JH)^T(JH)\}^{-1}(JH)^T JY \quad (11)$$

where $\Delta \hat{X}^H$ is the value of $\Delta X$ estimated by the hyperbolic surface localization method.

That is, for an estimated location $X_a$, the location estimated by the spherical surface localization method can be expressed by $$\hat{X}^S = X_a + \Delta \hat{X}^S$$

and the location estimated by the hyperbolic surface localization method by $$\hat{X}^H = X_a + \Delta \hat{X}^H.$$

However, $\Delta \hat{X}^H$ and $\Delta \hat{X}^S$ stated above involve bias errors due to sensor location errors $\Delta\alpha_i$, $\Delta\beta_i$, $\Delta\gamma_i$ (i=1, 2, ..., n) and errors in the propagation velocity of the radiation $\Delta Ve$. Therefore, these error factors are estimated on the basis of the difference between the locations estimated by the two localization methods. However, for the position of the sensors, only the position errors of (n−1) sensors with respect to the position of a certain sensor come into question.

The difference between the locations estimated by the two localization methods is expressed as follows.

$$\hat{X}^S - \hat{X}^H = \Delta \hat{X}^S - \Delta \hat{X}^H \quad (12)$$

$$= K^S Y - K^H Y$$

On the other hand, by using Eqs. (8) and (11), the following relationships are valid.

$$K^S = (H^T H)^{-1} H^T \quad (12')$$

$$K^H = \{(JH)^T JH\}^{-1}(JH)^T J \quad (12'')$$

Now suppose that $K^S$, $K^H$ and Y deviate by $\Delta K^S$, $\Delta K^H$ and $\Delta Y$ from their veritable values $\overline{K}^S$, $\overline{K}^H$ and $\overline{Y}$, respectively, due to sensor position errors and propagation velocity errors. That is, the following equations are valid.

$$K^S = \hat{K}^S + \Delta K^S$$

$$K^H = \hat{K}^H + \Delta K^H$$

Consequently, neglecting the second order increments, using the equation (12), the following approximate equation can be obtained.

$$\Delta X^S - \Delta X^H \approx (K^S - K^H)\Delta Y + (\Delta K^S - \Delta K^H)Y \quad (13)$$

Taking the definition of Y according to Eq. (7) into account, the following equation is valid.

$$\Delta Y = \tilde{L} \cdot \alpha \quad (14)$$

where $$\tilde{L} =$$

$$\begin{bmatrix} -P_x^1 - P_y^1 - P_z^1 & 0 & 0 & 0 & \cdots & \tau_1 \\ 0 & 0 & 0 & -P_x^2 - P_y^2 - P_z^2 & 0 & 0 & \cdots & \tau_2 \\ & & & \cdots & & & & \\ & & & \cdots & & 0 & 0 & P_x^{n-1} - P_y^{n-1} - P_z^{n-1} \tau_n \end{bmatrix}$$

$$\alpha = [\Delta\alpha_1 \Delta\beta_1 \Delta\gamma_1 \ldots \Delta\alpha_{n-1}\Delta\beta_{n-1}\Delta\gamma_{n-1}\Delta Ve]^T$$
with $P_i = (P_x^i P_y^i P_z^i)$.

$\alpha$ stated above is a vector whose elements are all the parameters of the sensor position errors and the propagation velocity errors.

On the other hand, since $\Delta K^S$ and $\Delta K^H$ contain inverse matrix operations, it is difficult to obtain analytically their differential coefficients. Therefore, here, they are obtained by numerical differentiation. That is, putting $$\Delta K^S = \sum_{i=1}^{n-1} (\Delta K_{\alpha i}^S \Delta\alpha_i + \Delta K_{\beta i}^S \Delta\beta_i + \Delta K_{\gamma i}^S \Delta\gamma_i), \quad (15)$$

where
$$\Delta K_{\alpha i}^S = \{K^S(x_1,y_1,z_1,\ldots,x_i+\Delta\alpha_i,\ldots) - K^S(x_1,y_1,z_1,\ldots,x_i,\ldots)\}/\Delta\alpha_i, \quad (16)$$

and calculating the difference between the values of $K^S$ for $x_i$ and $x_i + \Delta\alpha$ using equation (12'), $\Delta K_{\alpha i}^S$ can be obtained by numerical differentiation. $\Delta K_{\beta i}^S$ and $\Delta K_{\gamma i}^S$ are calculated in the same manner. Further, the calculation method for $\Delta K^H$ is also identical.

Then, by using Eqs. (13)–(16) and putting $$L_1 = (K_S - K^H)\tilde{L} \quad (17)$$

$$L_2 = [\Delta K_{\alpha 1} \Delta K_{\beta 1} \Delta K_{\gamma 1} \ldots \Delta K_{\gamma n-1} 0] \quad (18),$$

where $$\Delta K_{\delta i} = (\Delta K_{\delta i}^S - \Delta K_{\delta i}^H) Y$$

$$(\delta_i = \alpha_1, \beta_1, \gamma_1, \ldots \alpha_{n-1}, \beta_{n-1}, \gamma_{n-1}),$$

for the estimated location based on data of one measurement the following linear equation is obtained.

$$\Delta X^S - \Delta X^H \approx (L_1 + L_2)\alpha$$

Then, since the number of dimensions of the parameter $\alpha$ of the sensor position errors and the propagation velocity errors is great, a sufficiently large number of observation data are necessary to estimate them. Then, supposing that for the i-th observation datum $$\Delta X^S_i - \Delta X^H_i = (L_{1i} + L_{2i})\alpha$$

is valid, putting for n observation points $$\underline{Y} = \begin{bmatrix} \Delta X_1^S - \Delta X_1^H \\ \vdots \\ \Delta X_n^S - \Delta X_n^H \end{bmatrix}$$

$$\underline{L} = \begin{bmatrix} L_{11} + L_{21} \\ \vdots \\ L_{1n} + L_{2n} \end{bmatrix}$$

and using $$\alpha = (\underline{L}^T\underline{L})^{-1}\underline{L}^T\underline{Y} \qquad (19)$$

it is possible to estimate all the parameters $\alpha$.

If the bias errors are provoked only by the propagation velocity errors, simpler considerations than those mentioned above are possible. That is, starting from Eqs. (8) and (11), the following equations are obtained.

$$\Delta \hat{X}^S = (H^TH)^{-1}\{H^T(Y_S + \Delta Y_S)\}$$

$$\Delta \hat{X}^H = \{(JH)^T(JH)\}^{-1}\{(JH)^T(Y_H + \Delta Y_H)\}$$

If $\Delta Y_S$ and $\Delta Y_H$ are error components provoked only by propagation velocity errors $\Delta V_e$ and $Y_S$ and $Y_H$ are correct, the following equation should be valid.

$$(H^TH)^{-1}H^TY_S = \{(JH)^T(JH)\}^{-1}\{(JH)^TY_H\}$$

Consequently the following relationship can be obtained.

$$\Delta \hat{X}^S - \Delta \hat{X}^H = (H^TH)^{-1}(H^T\Delta Y_S) - \{(JH)^T(JH)\}^{-1}\{(JH)^T\Delta Y_H\} \qquad (20)$$

In order to estimate the propagation velocity errors $\Delta V$ by using a linear estimation method, putting $$\Delta Y_S = A_S \Delta V_e$$

$$\Delta Y_H = A_H \Delta V_e,$$

$\Delta Y_S$ and $\Delta Y_H$ are approximated by a linear transformation. Substituting them in Eq. (20), the following equation is obtained.

$$\Delta \hat{X}^S - \Delta \hat{X}^H = [(H^TH)^{-1}(H^TA_S) - \{(JH)^T(JH)\}^{-1}(JH)^TA_H]\Delta V_e$$

Then, putting $$B = (H^TH)^{-1}(H^TA_S) - \{(JH)^T(JH)\}^{-1}(JH)^TA_H \qquad (21),$$

The propagation velocity errors $\Delta V_e$ can be calculated by using the following formula.

$$\Delta V = (B^TB)^{-1}B^T(\Delta \hat{X}^S - \Delta \hat{X}^H) \qquad (22)$$

If in the equations (20) and (21), the error factor involved in $\alpha$ is assumed to be only $\Delta V_e$, L in equation (14) is given as follows:

$$\tilde{L} = \begin{bmatrix} \tau_1 \\ \tau_2 \\ \vdots \\ \tau_n \end{bmatrix}$$

Accordingly, $$\Delta Y_S = \Delta Y = \begin{bmatrix} \tau_1 \\ \tau_2 \\ \vdots \\ \tau_n \end{bmatrix} \cdot \Delta V_e$$

and therefore, $$A_S = \begin{bmatrix} \tau_1 \\ \tau_2 \\ \vdots \\ \tau_n \end{bmatrix}$$

Likewise, $$\Delta Y_H = J\Delta Y = J \cdot \begin{bmatrix} \tau_1 \\ \tau_2 \\ \vdots \\ \tau_n \end{bmatrix} \cdot \Delta V_e$$

and therefore, $$A_H = J \cdot \begin{bmatrix} \tau_1 \\ \tau_2 \\ \vdots \\ \tau_n \end{bmatrix}$$

When $\Delta V$ has been calculated, it is possible to obtain $\Delta \hat{X}^S$ and $\Delta \hat{X}^H$ without influence of the propagation velocity errors by using $Y_S - A_S\Delta V_e$ instead of the measured value $Y_S$ in Eq. (8) and $Y_S - A_s\Delta V_e$ instead of the measured value $Y_H$ in Eq. (11).

Figure 4:
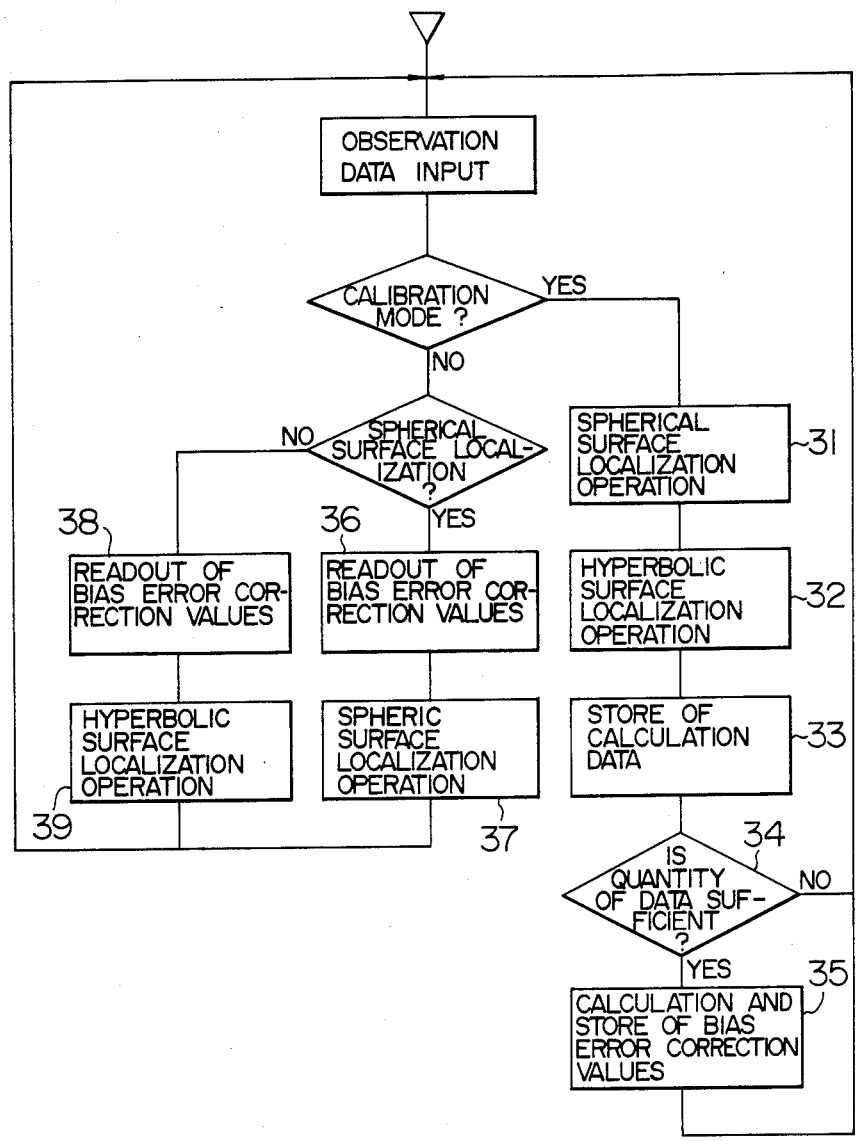
FIG. 4 is a flow chart showing an example of the processing in the processing device of a localization system to which this invention is applied.

FIG. 4 is a flow chart for the operations in the processing device 4 indicated in FIG. 1, in the case where the present invention is applied. The commutation from the normal localization mode to the calibration mode can be effected either by an operator's command or by a periodical automatic commutation. In the calibration mode, at first $\Delta \hat{X}_i^S$ and $\Delta \hat{X}_i^H$ are calculated on the basis of observation data by using Eqs. (8) and (11) (Steps 31 and 32). Further, in a practical localization system, a present location is tentatively presupposed on the basis of history of past localization results and localization is effected on the assumption of the location thus presupposed by calculating $\Delta\hat{X}^S$ and $\Delta\hat{X}^H$ with respect to the presupposed location. In accordance therewith, for $d_i$ and $P_i$ in Y and H as well as quantities derived therefrom, their values corresponding to this presupposed location are used.

Then, $L_{1i}$ and $L_{2i}$ are calculated by using Eqs. (17) and (18) and the calculation results thus obtained are stored in the memory (Step 33). The process stated above is repeated to accumulate successive observation data (Step 34), until calculated data necessary to estimate all the error parameters become sufficient, and when a predetermined quantity of data is accumulated, each of the error parameters ($\alpha$) is calculated by using Eq. (19) and stored in the memory (Step 35). Further, when only the propagation velocity errors are in question, B is calculated in Step 33 by using Eq. (21) and $\Delta V_e$ is calculated in Step 35 by using Eq. (22).

In the localization mode, the error parameters calculated and stored in Step 35 of the calibration mode are readout from the memory (Step 36 or 38) and the values of Y and H (only Y in the case where only propagation velocity should be corrected) are corrected by using the error parameters thus readout for the calculation of $\Delta X^S$ or $\Delta X^H$ in Step 37 or 39 by using Eq. (8) or (11).

Figure 5:
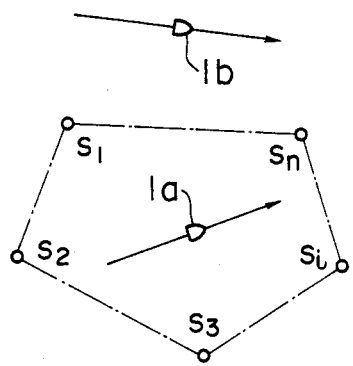
FIG. 5 is a schematic showing the relation in the relative position between the moving body and the group of the sensors.

It is empirically known that the difference between the localization results obtained by the spherical surface localization method and by the hyperbolic surface localization method is greater when the moving body 1 is out of the region delimited by the lines connecting adjacent sensors $S_1$–$S_n$ (1b in FIG. 5) than when it is in the region (1a in FIG. 5). Consequently, in general, it is more effective to effect the calibration mode in the former situation. For this quantitative judgement the geometric dilution of precision (hereinbelow abbreviated to GDOP) for determining which should be used, the hyperbolic surface localization method or the spherical surface localization method, will be explained below. For a further explanation of this GDOP refer to e.g. "Global Positioning System NAVSTAR/GPS" by Murata, Keisoku to Seigyo (Measurement and Control), Vol. 21, No. 2 (1982) (in Japanese) or H. B. Lee: "A Novel Procedure for Assessing the Accuracy of Hyperbolic Multilateration Systems" IEEE Transactions on Aerospace and Electronics Systems, Vol. AES-11, No. 1 (1975).

The GDOP stated above indicates location estimation errors as a function of the geometric relation between the moving body and sensors, and errors, and for the case of the spherical surface localization method it is given by the square root of the sum of the diagonal elements in the covariance matrix given by $$P^S = (H^T R^{-1} H)^{-1} \tag{23}$$

where R is a $n \times n$ matrix $$R = \begin{bmatrix} \sigma_1^2 & & 0 \\ & \sigma_2^2 & \\ & & \ddots \\ 0 & & \sigma_n^2 \end{bmatrix},$$

$\sigma_i^2$ representing variance of reception time measurement of a sensor i, and H representing a value determined by the geometric relation between the sensors and the moving body given by $$H = \begin{bmatrix} i_1' \\ i_2' \\ \vdots \\ i_n' \end{bmatrix},$$

$i_i'$ being a unit direction vector from the moving body to the sensor i. The GDOP in the spherical surface localization method is given by:

$$G_S = [tr(P^S)]^{\frac{1}{2}} \tag{23'}$$

For the case of the hyperbolic surface localization method the GDOP stated above is given by the square root of the sum of the diagonal elements in the covariance matrix given by $$P^H = ((LH)^T (L^T RL)^{-1} (LH))^{-1} \tag{24},$$

where H and R are the same as those indicated for the spherical surface localization method and L is a matrix given by $$L = \begin{bmatrix} 1, -1 & & 0 \\ & 1, -1 & \\ & & \ddots \\ 0 & & 1, -1 \end{bmatrix}.$$

L is a matrix based on the combination of the sensors used for the hyperbolic surface localization method and in this case it forms a hyperbolic surface with respect to the sensor i and the sensor i+1 by subtracting a time observation equation for the sensor i+1 from a time observation equation for the sensor i. The GDOP in the hyperbolic surface localization method is given by:

$$G_H = [tr(P^H)]^{\frac{1}{2}} \tag{24'}$$

Denoting $G_S$ for GDOP of the spherical surface localization method and $G_H$ for that of the hyperbolic surface localization method, it is desirable to use the hyperbolic surface localization method, when $G_S > G_H$, and the spherical surface localization method, when $G_H > G_S$. The operations described above are carried out in the processing device 4 within the moving body localization calculation device 2. The flow chart for these operations is shown in FIG. 6.

Figure 6:
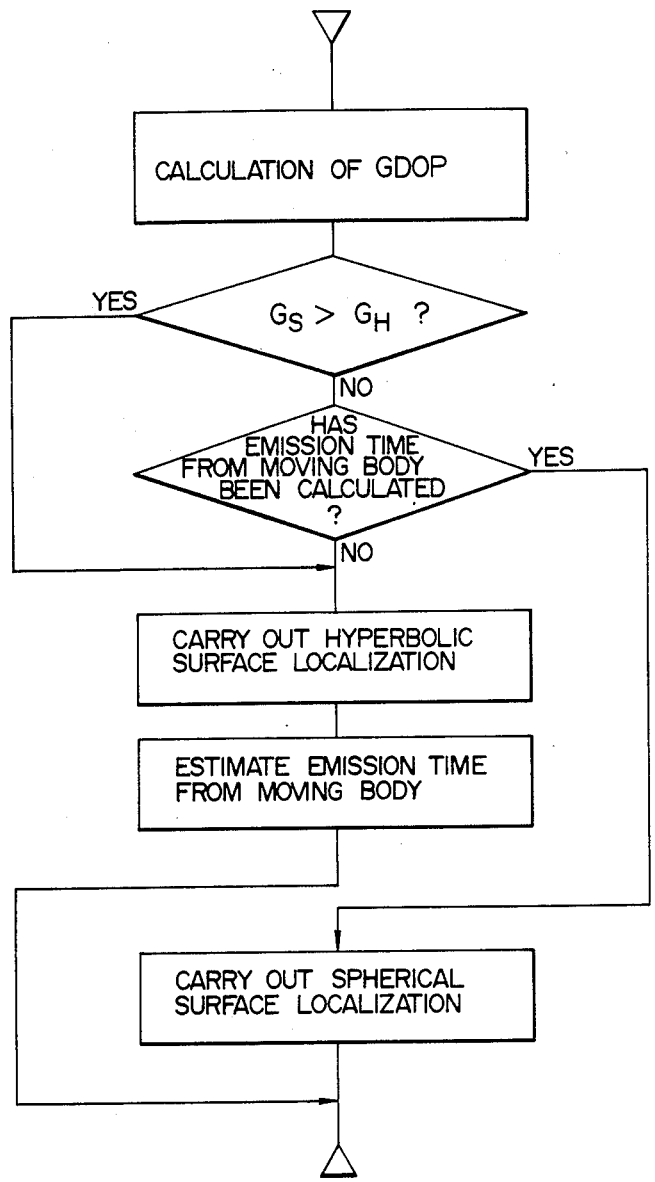
FIG. 6 is a flow chart showing an example of the processing for choosing either one of the localization methods.

The operations shown in FIG. 6 are repeated with a certain time interval. At first GDOP for the hyperbolic surface localization method and that for the spherical surface localization method are calculated. When $G_S > G_H$, the location ($\hat{x}$, $\hat{y}$, $\hat{z}$) of the moving body is obtained by the hyperbolic surface localization method. Further the emission time $T^*$ of the radiation from the moving body is estimated by a method described later.

To the contrary, when $G_H > G_S$, it is checked whether the spherical surface localization method can be adopted or not. That is, it is checked whether the estimated value $T^*$ obtained by the process described above can be used or not and when it can be used, the spherical surface localization method is carried out. To the contrary, when the estimated value $T^*$ cannot be used, the hyperbolic surface localization method is carried out.

Further, in the estimation process of the emission time $T^*$ of the radiation stated above, it is preferable to indicate that the estimated value $T^*$ can be used, when the estimation process for $T^*$ has been carried out a predetermined number of times.

Next the method of estimating the emission time of the radiation from the moving body 1 starting from the hyperbolic surface localization method will be explained below.

Denoting $T^*$ as the time when a pulse is emitted, the location $(\hat{x}, \hat{y}, \hat{z})$ of the moving body can be calculated according to the hyperbolic surface localization method by using reception times $t_1^*$ to $t_n^*$ of the pulse. Consequently the emission time $T^*$ is estimated by using information of the n sensors as follows.

$$\hat{T}^* = \frac{1}{n}\left[\Sigma\left(t_i - \frac{1}{V_e}\sqrt{(\hat{x} - \alpha_i)^2 + (\hat{y} - \beta_i)^2 + (\hat{z} - \gamma_i)^2}\right)\right] \quad (25)$$

However, a value $T^*$ estimated by using a single pulse can be considerably different from the veritable value $T^*$ due to various error factors. On the other hand, since the time interval $T_o$ between two adjacent pulses after $T^*$ stated above is assumed to be constant, the emission time of the pulses is determined by $$T^* + mT_o \, (m=1, 2, \ldots).$$

That is, the emission time $T^*(m)$ of the m-th pulse counting from $T^*$ is obtained, on the basis of the estimation data of the m-th location of the moving body, by using the following formula.

$$\hat{T}^*(m) = \hat{T}^* + mT_o \quad (26)$$

Starting therefrom, $T^*$ can be calculated by using $$\hat{T}^* = \frac{1}{m}\left[\sum_{i=0}^{m}\{\hat{T}^*(i) - iT_o\}\right]. \quad (27)$$

Figure 7:
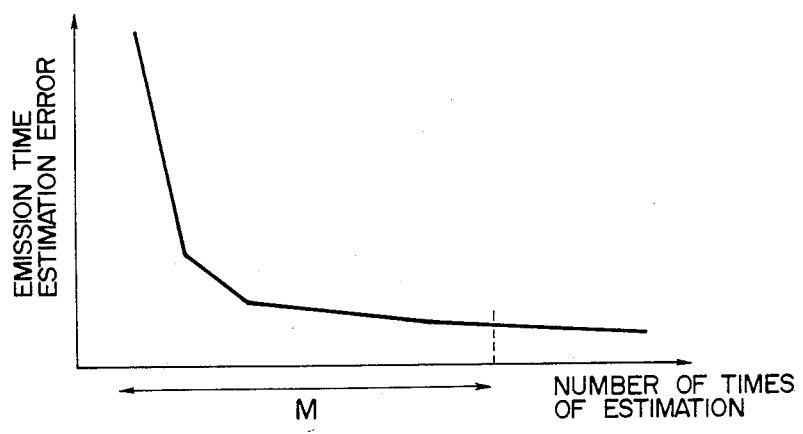
FIG. 7 is a diagram indicating an error curve for the estimation of the emission time.

The relation between emission time estimation errors of $T^*$ thus obtained and the number of times of the estimation of $T^*$ by using pulses is shown qualitatively in FIG. 7.

That is, a number of times M, for which the emission time estimation errors are sufficiently small, is set and the estimated values of $T^*$ after the M-th estimation are used. In this case, the emission time of the k-th pulse after $T^*$ is estimated to be $$\hat{T}^*(k) = \hat{T}^* + kT_o \quad (28).$$

By this it becomes possible to utilize the spherical surface localization method.

In the embodiment described above, the selection between the hyperbolic surface localization method and the spherical surface localization method is determined depending on the value of GDOP, however, this invention is not limited to this manner, but it is evident that any other suitable index can be also used.

Errors in the estimation of the location of the moving body obtained by the process described above are approximately equal to those which are smaller between the errors of the location obtained by the hyperbolic surface localization method and those obtained by the spherical surface localization method.

The above explanation can be applied as well to the case where radiations emitted at a plurality of different places are received by a sensor disposed on the moving body, and the location of the moving body, at the time when the radiations are received is obtained on the basis of reception times by the sensors. This method can be utilized, for example, in the case where radiations emitted by a plurality of artificial satellites are received by a sensor disposed on a ship. Errors in the estimation of the location of the ship are obtained. 2 or 3 artifical satellites, which give small errors in the estimation of the location are preferable for localization. Further, the above explanation can be applied naturally to the case where the body stands still.

According to this invention, bias errors, which could not be removed by the prior art localization system based on the least-squares method, are compensated. It is possible to use both the localization methods by estimating the emission time of the radiations, such as acoustic wave, electromagnetic wave, etc., emitted by a moving body. The hyperbolic surface localization method and the spherical surface localization method can be utilized, such that the choice between which localization method should be used is made possible by estimating errors in the localization obtained by both the localization methods, enabling location of the moving body to be estimated with high precision.

What is claimed is:

1. A method of localizing a moving body using a localization system having a plurality of sensors disposed at different places for receiving energy of radiation, such as acoustic waves, electromagnetic waves, etc., emitted by the moving body, and a moving body localization calculation device connected to said plurality of sensors said method comprising the steps of:
   estimating locations of said moving body using two different estimation methods,
   correcting physical parameters of said localization system, based on differences between the estimated locations estimated by said two different estimation methods, and
   calculating a location of said moving body on the basis of reception times of the radiation received by said plurality of sensors and the corrected physical parameters.

2. A method of localizing a moving body according to claim 1, wherein said two different estimation methods are the hyperbolic surface localization method and the spherical surface localization method.

3. A method of localizing a moving body according to claim 1, wherein said physical parameters are the positions of said plurality of sensors and the propagation velocity of said radiation.

4. A method of localizing a moving body according to claim 1, wherein said two different estimation methods are the hyperbolic surface localization method and the spherical surface localization method, and said physical parameters are the position of said plurality of sensors and the propagation velocity of said radiation.

5. A method of localizing a moving body using a localization system having a sensor disposed on the moving body for receiving energy of radiation, such as acoustic waves, electromagnetic waves, etc., emitted by an emitter at a plurality of different places, and a moving body localization calculation device connected to said sensor, said method comprising the steps of:

estimating locations of said moving body using two different estimation methods, correcting physical parameters of said localization system, based on differences between the estimated locations estimated by said two different estimation methods, and calculating a location of said moving body on the basis of reception times of the radiation received by said sensor and the corrected physical parameters.

6. A method of localizing a moving body according to claim 5, wherein said two different estimation methods are the hyperbolic surface localization method and the spherical surface localization method.

7. A method of localizing a moving body according to claim 5, wherein said physical parameters are the positions of said different places and the propagation velocity of said radiation.

8. A method of localizing a moving body according to claim 5, wherein said two different estimation methods are the hyperbolic surface localization method and the spherical surface localization method, and said physical parameters are the positions of said different places and the propagation velocity of said radiation.

9. A method of localizing a moving body using a localization system having a plurality of sensors disposed at different places for receiving energy of radiation, such as acoustic waves, electromagnetic waves, etc., emitted by the moving body, and a moving body localization calculation device connected to said plurality of sensors, said method comprising the steps of:

estimating the emission time of the radiation emitted by said moving body using the hyperbolic surface localization method, estimating locations of said moving body using at least the spherical surface localization method, based on the estimated emission time of the radiation emitted by said moving body, and calculating a location of said moving body on the basis of reception times of the radiation by said plurality of sensors and the locations of said moving body estimated by the spherical surface localization method.

10. A method of localizing a moving body according to claim 9, further comprising the steps of:

calculating errors in the estimation of the location of said moving body using the hyperbolic surface localization method and the spherical surface localization method, and selecting one of the localization methods for localizing the moving body, based on the results of the calculated errors.

11. A method of localizing a moving body according to claim 10, wherein the errors in the estimation of the location of said moving body are calculated using the geometric dilution of precision (GDOP) method.

12. A method of localizing a moving body using a localization system having a sensor disposed on the moving body for receiving energy of radiation, such as acoustic waves, electromagnetic waves, etc., emitted by an emitter at a plurality of different places, and a moving body localization calculation device connected to the sensor, said method comprising the steps of:

estimating the emission time of the radiation emitted by said moving body using the hyperbolic surface localization method, estimating locations of said moving body using at least the spherical surface localization method, based on the estimated emission time of the radiation emitted by said moving body, and calculating a location of said moving body on the basis of reception times of the radiation by said sensor and the locations of said moving body estimated by the spherical surface localization method.

13. A method of localizing a moving body according to claim 12, further comprising the steps of:

calculating errors in the estimation of the location of said moving body using the hyperbolic surface localization method and the spherical surface localization method, and selecting one of the localization methods for localizing the moving body, based on the results of the calculated errors.

14. A method of localizing a moving body according to claim 13, wherein the errors in the estimation of the location of said moving body are calculated using the geometric dilution of precision (GDOP) method.

* * * * *